United States Patent [19]
Chelette

[11] Patent Number: 5,285,685
[45] Date of Patent: Feb. 15, 1994

[54] PERCEIVED ATTITUDE APPARATUS AND METHOD

[75] Inventor: Tamara L. Chelette, Miamisburg, Ohio

[73] Assignee: The United States of America as represented by the Secretary of the Air Force, Washington, D.C.

[21] Appl. No.: 880,830

[22] Filed: May 11, 1992

[51] Int. Cl.⁵ ............................................. G06F 3/02
[52] U.S. Cl. .................. 73/432.1; 340/407.1; 73/865.6
[58] Field of Search ............... 73/865.6, 865.7, 432.1; 340/686, 689, 965, 407, 980; 280/1.21, 1.12; 434/35–42, 45

[56] References Cited

U.S. PATENT DOCUMENTS

| | | | |
|---|---|---|---|
| 2,687,580 | 8/1954 | Dehmel | 434/59 |
| 2,754,505 | 7/1956 | Kenyon | 340/407 |
| 2,871,578 | 2/1959 | Faisandier | 434/59 |
| 3,478,569 | 11/1969 | Aichinger | 73/1 |
| 3,561,233 | 2/1971 | Bowman et al. | 33/73 |
| 4,189,726 | 2/1980 | Rosa et al. | 340/689 |
| 4,484,191 | 11/1984 | Varva | 340/965 |
| 4,713,651 | 12/1987 | Morag | 340/407 |
| 4,791,408 | 12/1988 | Heusinkveld | 340/407 |
| 4,905,001 | 2/1990 | Penner | 340/407 |
| 5,021,982 | 6/1991 | Crosbie et al. | 434/59 |

Primary Examiner—Robert Raevis
Attorney, Agent, or Firm—Gerald B. Hollins; Thomas L. Kundert

[57] ABSTRACT

An arrangement for achieving reliable communication of perceived attitude information from the test subject in an environmentally controlled spatial disorientation study. The communications system includes a talking with the hand protocol wherein the orientation of the test subject's opened hand is sensed upon command from test monitoring persons. Orientation of the test subject's hand is remotely sensed by way of a three-axis of rotational freedom transducer apparatus in which the test subject's hand is suspended in a manner providing minimal orientation feedback to the test subject. Use of the described system includes a selection of additional physiological influencing environmental inputs for the test subject including visual and audible stimulus information.

20 Claims, 3 Drawing Sheets

PERCEIVED ATTITUDE APPARATUS AND METHOD

RIGHTS OF THE GOVERNMENT

The invention described herein may be manufactured and used by or for the Government of the United States for all governmental purposes without the payment of any royalty.

BACKGROUND OF THE INVENTION

This invention relates to the field of living test subject signal interfacing and to the collection of vertebrate test subject originating stress-influenced data signals.

Spatial disorientation, which is also known as attitude perception error, is known to present a significant threat to an aircraft pilot or other flight vehicle crewmember. Indeed, many of the aircraft fatalities, injuries, and property loss incidents occurring since the Wright brothers era have been attributed to erroneous perceptions of aircraft attitude and the resulting pilot action. In the early days of flying, before the array of flight instruments now routinely used was available, it was indeed necessary for a pilot to fly an aircraft with considerable attention to the forces incurred by his body—i.e., to fly literally by the "seat of his pants" in order to maintain a coordinated pattern of flight.

These early flying procedures relied heavily and sometimes perilously on what is now termed "vestibular perception", a term which describes perception based on the central cavity of the bony labyrinth of the ear and parts of the membranous labyrinth that it contains. A related concept known as "Proprioceptive perception" was also used instinctively by these early flyers and continues to be important even in the present invention. Proprioceptive perception refers to other body sensing capabilities such as pressure on the torso or portions of the peripheral limbs.

It is now well understood that spatial disorientation results from an error between a test subject's perceived orientation and his/her actual orientation. A discussion of this concept is to be found in the technical article "Erroneous Perception of Vertical Motion by Humans Seated in the Upright Position", by Jones Malcolm, (*Acta Oto-Laryngologica*, May 1977). It is also well understood that a test subject may be unaware that he/she is a victim of spatial disorientation, especially for transient periods that are incompatible with the duties imposed on a modern aircraft pilot.

A classic example of spatial disorientation and its danger is known to naval aviation pilots from the carrier-launched aircraft sequence. During aircraft rest or taxi maneuvers on a carrier flight deck, the pilot of such an aircraft perceives the gravity vector to be in its correct and straight down location. This perception is drastically influenced, however, by the forces of engine thrust and catapult launch acceleration. During a full throttle, catapult-assisted takeoff, such a pilot experiences a sharp backward rotation of the apparent direction of the gravity vector—as a result of the summation of the true gravity vector with the horizontally directed force vectors from engine thrust and catapult force. Because of this backward rotation, an inexperienced person tends to apply attitude correction to the aircraft in order to rotate the force summation vector back to the normal position of gravity. This correction is accomplished by rotating the nose of the aircraft downward just after take-off. In this instance, an erroneous perception and its first blush nose-down correction has obvious life-threatening potential for a pilot who has just left the deck of an aircraft carrier and is already in a marginal altitude and speed condition of flight.

Ambient vision is the primary and usually reliable mechanism by which an aircraft crewmember can overcome an incident of spatial disorientation and achieve correct orientation of an aircraft. Pilots are, however, often deprived of this ambient vision input while in flight—deprived by such conditions as clouds, weather, darkness, pilot distractions, and even formation flying; such effects are described in the published article "Pilot Disorientation and Use of a Peripheral Vision Display", by Richard Malcolm (*Aviation, Space and Environmental Medicine*, March 1984).

During periods of deprived ambient vision, a pilot notwithstanding the availability of usually reliable flight instruments, can be strongly influenced by vestibular or middle ear perceptions of his or her orientation. As is well known in the aviation art, however, these vestibular system perceptions are, as in the case of the Navy aircraft carrier pilot, subject to acceleration illusions. Moreover these accelerations are not limited to one axis or direction of action, but may have multiple axis components.

In view of the demands placed upon the pilot of a modern aircraft, particularly by a tactical aircraft, demands including the tolerance of large and relatively long-term g-forces from a range of differing directions, there is an immediate need in the aerospace community to understand the effects of multi-axis maneuvering on vestibular perception in the absence of ambient vision. This need has been recognized in the technical community, as is evidenced by such news publications as "F-117 Crash Reports Cite Pilot Fatigue, Disorientation" by William B. Scott (*Aviation Week & Space Technology*, May 1989), and "Spatial Disorientation and Loss of Attitude Awareness: Impact on the USAF" by Britton L. Marlowe, (58th Annual Scientific Meeting of the Aerospace Medical Association, May 1987).

The information obtained from an improved understanding of multi-axis maneuvering effects on vestibular perception can be used to improve the design of aircraft and their instrumentation systems, and to improve the instruction of aircraft pilots, especially by way of acquainting experienced instructor pilots with newly-acquired factual information. Studies in this field may be made in aircraft, but are, however, more cost effectively and conveniently accomplished in ground-based dynamic effect simulators, g-force simulators or centrifuges, in which a test subject can be exposed to a controlled variety of conditions such as off-axis positioning, darkness, presence of clutter information, a regimen of distracting duties, and variations of ambient conditions—all under the greatest possible degree of monitoring, safety, and repeatability.

Several arrangements have, in fact, been used to identify the perceived attitude of a test subject while exposed to such conditions. Most of these arrangements have been based on a single pivot point transducer arrangement that is operated by the test subject. Included in these previously used devices is the horizontal bar which is rotated to indicate perceived roll angle as is described by M.J. Correia et al in the publication "On Predictive Equations for Subjective Judgments of Vertical and Horizon in a Force Field" (*Acta Octo-Laryngologica*, 1968). In addition, Gillingham et al in the paper "Quantification of the Somato Gravic Illusion in the Vertifuge", (58th Annual Scientific Meeting of the Aerospace Medical Association, May 1987), have worked with a "down pointer" which is pivoted at the top of a cockpit or test chamber and is used by the test subject to indicate his/her perception of the down direction.

These previous attitude communicating arrangements have, however, overlooked a useful and inherent tendency of people, especially aircraft pilots, to talk with their hands. This well-known tendency usually includes use of the palm of the hand to indicate the downward direction or lower surface of an aircraft. These previously employed attitude communicating transducers have also been limited in effectiveness by the tendency of the down pointer to act as a pendulum and to thereby provide a reference frame or biasing information to a test subject The down pointer is also limited by a more subtle and human experience related concept in that people are accustomed to orienting themselves with respect to a horizon rather than a vertical object. Since pilots are also accustomed to a horizontal attitude indication, a down pointer arrangement may well introduce error into any obtained measurement simply because people are poorer judges of "down" than of "level". The herein-described perceived attitude transducer provides an improvement over previous communication arrangements and also provides a tool for testing the significance of possible perceived attitude biasing factors. The presently described perceived attitude transducer also makes use of the natural inclination of pilots to talk with their hands and to describe their orientation in space by movement of a prone hand into a selected orientation with respect to their torso.

The patent art reveals a number of inventions that are concerned with the straight and level condition for a variety of objects. Included in this art is the U.S. Pat. No. 3,478,569 of H.H. Aichinger, which is concerned with an apparatus usable in the rigging of airplane control surfaces, that is, the alignment of control surfaces to the neutral or straight and level flight condition at initial manufacture and assembly of the aircraft.

This patent art also includes the U.S. Pat. No. 3,561,123, of C.G. Bowman et al, which is concerned with a hand level apparatus having a vertically disposed and horizontally elongated closed liquid reservoir. Also included in this patent art is the U.S. Pat. No. 4,189,726 of Frank Rosa et al, which provides a level orientation indication for a portable power hand tool such as an electric drill.

Additionally included in this patent art is the U.S. Pat. No. 4,484,191 of G.S. Vavra, in which tactile or feeling-sensed signals indicating the execution of an uncoordinated turn condition by an aircraft are provided. Also included in this patent art is the U.S. Pat. No. 4,713,651 of Myer Morag in which tactile or feeling senses are used to display information in an information saturated environment such as a modern aircraft cockpit.

While each of these prior patents bears some distal relationship with the present invention, none of these patents nor their combination provide a g-force disregarding reliable communication path from a human or other test subject to, for example, a data processing system.

SUMMARY OF THE INVENTION

The present invention provides a tactile or manually operated test subject to data collector communications apparatus which is highly user-friendly, free of clue providing characteristics to the test subject, and is also notably simple, inexpensive, and reliable in nature.

It is an object of the invention therefore, to provide an improved peripheral limb communication apparatus for a human or other test subject.

It is another object of the invention to provide a tactile or hand-operated communication apparatus which is largely immune to the effects of g-force fields.

It is another object of the invention to provide a tactile or hand-operated communications apparatus in which g-force immunity can be maintained with a variety of differing test subjects of differing physical size.

It is another object of the invention to provide a tactile communications apparatus that is responsive to manual movements in each of three coordinate axes aligned directions.

It is another object of the invention to provide a tactile communications apparatus that may be used in a clinical or other non-aircraft related environment.

It is another object of the invention to provide a method for tactile communications that may be used for straight and level or other information communication purposes.

It is another object of the invention to provide a tactile communications apparatus which may be used to improve understanding of the vestibular or middle ear attitude perception system of a vertebrate test subject such as a human.

It is another object of the invention to provide a tactile communications apparatus which may be used in the control of an aircraft or in other human-to-machine communication environments.

It is another object of the invention to provide a tactile communications apparatus that may be fabricated from commonly available and low-cost components.

It is another object of the invention to provide a tactile communications apparatus which is adaptable for use by a large variety of test subjects.

It is another object of the invention to provide a tactile communications apparatus which may be conveniently initialized to a reference or to a home position condition.

It is another object of the invention to provide a tactile communications apparatus which may be used to sense manual movements along the directions of one, two, or three coordinate axes.

Additional objects and features of the invention will be understood from the following description and claims and the accompanying drawings.

These and other objects of the invention are achieved by the method for obtaining perceived physical attitude describing information from a g-force stressed human test subject to a data processor comprising the steps of: disposing the human test subject in a body conforming and torso supporting capture frame located within a g-force generating apparatus; supporting an arm and hand peripheral extremity of the human test subject in a body displaced position wherein engagement with a hand position responsive multiple axis of freedom electrical signal generating transducer apparatus is convenient and comfortable to the test subject and minimally influenced by g-force fields; assigning palm positioning as a talk or converse with the hand communication protocol for communication from the human test subject to the data processor; engaging predetermined hand portions of the human test subject in captive relationship with the hand position responsive multiple axis of freedom electrical signal generating transducer apparatus; exposing the test subject and transducer apparatus to g-force field of predetermined selective orientation; selecting with predetermined regimen a plurality of hand positionings by the human test subject as communicated perceptions by the test subject of experienced physical attitude; and conveying the electrical signals from the transducer apparatus to the data processor via electrically conductive communicating paths.

DETAILED DESCRIPTION

Figure 1:
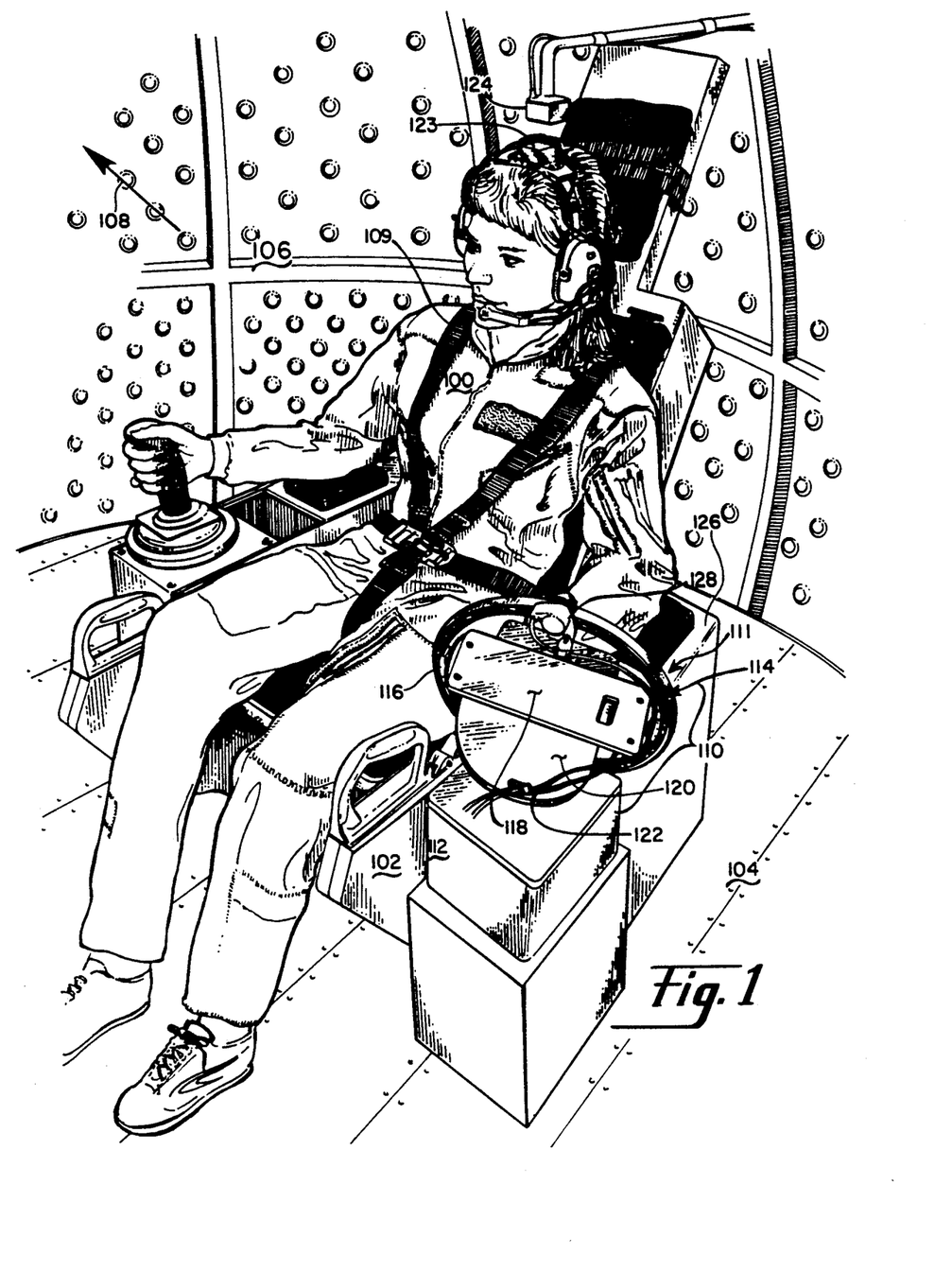
FIG. 1 shows an overall perspective view of apparatus according to the invention in the environment of a dynamic effects simulator gondola.

FIG. 1 in the drawings shows a perspective view of a tactile communications system that is suitable for use by the human test subject deployed in the gondola of the dynamic effects simulator (DES) or centrifuge used by the U.S. Air Force at Wright-Patterson AFB OH. The general concept of such DES equipment and some additional details thereof are shown, for example, in the patent of D.W. Repperger et al, U.S. Pat. No. 4,619,506, which is hereby incorporated by reference herein. In the FIG. 1 drawing, a test subject 100 is shown to be reclined in a cradle or seat structure 102 which is mounted to the floor 104 of the DES gondola 106.

The FIG. 1 drawing also shows additional details of the DES test apparatus including the arrow 108 which indicates the direction of the centripetal force that is acting in the DES apparatus, that is, the force which opposes the centrifugal force generated by rotation of the gondola about an axis which is also located in the direction of the arrow 108. As is indicated by the depicted orientation of the cradle or seat structure 102 and the test subject 100, the FIG. 1 drawing represents a positioning of the test subject at an angle of between 45° and 90° with respect to the direction of the centripetal force acting in the FIG. 1 test apparatus. During use of the FIG. 1 test scene, the test subject 100 is normally restrained in the cradle or seat structure 102 by the use of straps 109 which are shown in somewhat looser than normal condition in FIG. 1. Such apparatus is especially needed during testing at higher g-force loadings. Also represented in FIG. 1 is the head position sensing apparatus which employs a magnetic sensor 124 that is coupled to a magnetic member 123 normally located on a protective helmet used by the test subject 100. The magnetic member 123 is shown in FIG. 1 to be disposed on the headband of a telecommunications headset for drawing convenience. Either the magnetic sensor 124 or the member 123 provides a magnetic field throughout the region of possible locations of the test subject's head and operates according to magnetic signal decoding algorithm concepts that are known in the art.

Additionally shown in FIG. 1 is a tactile communications apparatus 110 by which the test subject 100 is enabled to employ a talking or conversing with the hands protocol in order to communicate his/her perceptions of attitude, locations of the earth and other quantitative information needed to understand the human physiological response to g-forces and other stress factors achievable with the FIG. 1 apparatus. In addition to the tactile communications apparatus 110, the DES apparatus is provided with television monitors, voice communications, and a variety of protective sensors as are appropriate for experimental environments.

The tactile communications apparatus 110 is shown in the FIG. 1 view to include a three-axis movement apparatus 111 and an arm rest assembly 126 for the test subject 100. The three-axis movement apparatus 111 is also shown to include a base member 112 in which is located a rotational bearing assembly relating to yaw axis rotational movements by the hand of the test subject 100. The base member 112 is attached to a side frame portion of the cradle or seat structure 102 in a conventional manner and is usually arranged such that disposition of the three-axis movement apparatus on either the left or right side of the test subject 100 is convenient.

The three-axis movement apparatus 111 also includes a bearing assembly 114 which provides rotational freedom about the roll axis of the hypothetical aircraft in which the test subject 100 is received. Rotational freedom about the pitch axis of the hypothetical aircraft is provided by the tilting bearing assembly 116 which, like other details of the three-axis movement apparatus, shown with greater clarity in FIG. 3 of the drawings.

Each of the roll axis and pitch axis bearing assemblies 114 and 116 is provided with position sensing potentiometer elements, as is indicated at 128 for the rall axis potentiometer, in order that remote indications and remote sensing of the information communicated by the test subject 100 be possible. Signals from the roll and pitch axis potentiometers are conveyed by way of the electrical conductor assembly 122 to the remote indicating or remote sensing apparatus. In a similar manner, a third potentiometer or a digital encoder, or a magnetic rotational position sensing apparatus may be provided within the base member 112 for indicating or sensing the yaw axis information provided by the test subject 100.

Additional FIG. 1 illustrated details of the three-axis movement apparatus 111 include the pitch axis bearing suspended support member 118, and the hand engagement assembly 120 which is mounted thereon. Since the pitch axis bearing suspended support member 118 is actually suspended on each of the three bearings described for the three-axis movement apparatus, the support member 118 is actually capable of moving in any and all of the three rotational directions and is therefore a three-axis or three degree of freedom support portion of the FIG. 1 apparatus.

In many uses of the three-axis movement apparatus 111 and the other elements shown in the FIG. 1 drawing, signals from the yaw axis movement sensing potentiometer included in the base 112 are not required, especially since yaw axis acceleration and movement of a modern-day aircraft are known to occur only under limited conditions such as occur in an uncontrolled spin, in a sloppy or uncoordinated execution of a turn maneuver, and in other special situations. With the advent of vectored thrust engines and other newly-considered aircraft capabilities, however, this yaw axis movement and the study of human responses thereto may be of increased interest in future uses of the FIG. 1 apparatus.

During use of the FIG. 1 apparatus to study spatial disorientation of aircrew members, it is considered to be important that the test subject 100 not be provided with proprioceptive perception clues or other indications of the net gravity vector which would influence his/her judgment processes as are being evaluated. Indeed, a significant advantage of the FIG. 1 disclosed apparatus is believed to reside in the greater degree of absence of such clue or hint information than has been achieved in the vertical stick and other tactile communications apparatus disclosed above. As is discussed in some detail below, both the arrangement of the three-axis movement apparatus itself as well as the disposition of this apparatus with respect to the arm rest assembly 126 and also the location of these elements with respect to the test subject 100 can easily result in a FIG. 1 system which provides undesirable clue information to the test subject 100. Such clues bias any physiological response data achieved with the system.

Figure 2:
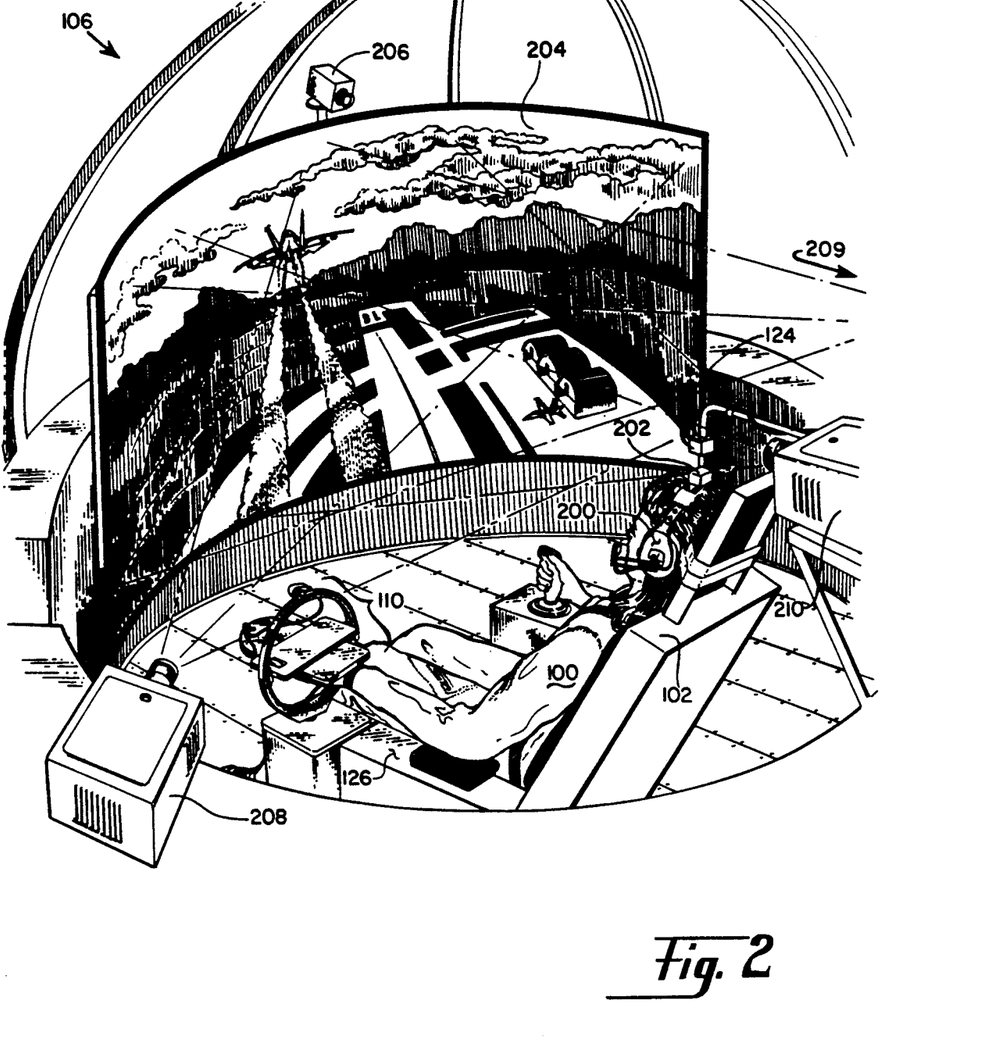
FIG. 2 shows a backside additional view of the FIG. 1 test subject and gondola apparatus.

FIG. 2 in the drawings shows another perspective of the FIG. 1 environment, a perspective viewed from behind the test subject 100 and showing elements not visible in the FIG. 1 view. To the best degree possible, the elements from FIG. 1 that are repeated in the FIG. 2 view are identified with the same number used in FIG. 1 and newly appearing elements in FIG. 2 are identified with numbers in the 200 series.

Elements shown for the first time in the FIG. 2 drawing include the test subject monitoring television camera 206, the optical screen 204, and the image projectors 208, 209, and 210 which may be used to present the test subject 100 with, for example, terrain feature information. The screen may also present combinations of terrain and celestial body representations such as the sun and a horizon or the moon and ocean reflections, or alternately, may be employed to present random and changing patterns, or patterns which call for some degree of concentration and activity on the part of the test subject 100 especially during a g-force stressing portions of a test study. In view of the subjective differences between test subjects and the possibly subtle nature of spatial disorientation influences between test subjects, the ability to present predetermined visual images, or alternately, an environment of total darkness, is believed important to a full understanding of the spatial disorientation syndrome.

Figure 3:
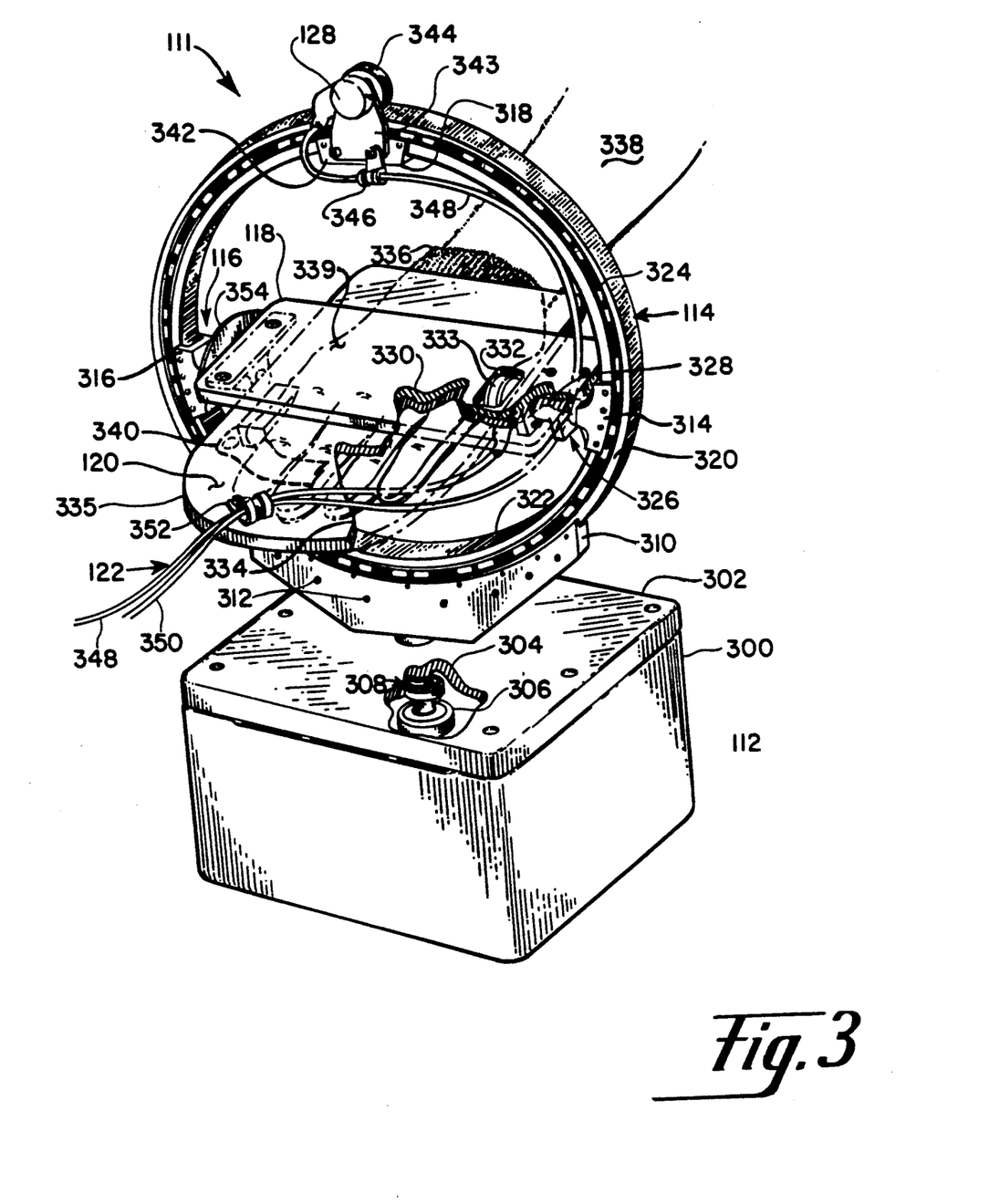
FIG. 3 shows a more detailed view of the tactile communications transducer apparatus of the present invention.

FIG. 3 in the drawings shows another perspective view of the three-axis movement apparatus 111 of FIGS. 1 and 2. Once again, whenever possible, new numbers in the 300 series are assigned to details which appear for the first time in FIG. 3. In the FIG. 3 representation, the base member 112 is shown to consist of a box-like housing 300 onto which is attached a plate member 302 with the yaw axis bearing assembly 308 being attached to the plate 302. The bearing assembly 308 preferably includes a pair of vertically displaced sleeve bearings or ball bearings, and includes a shaft portion extending downwardly out of these bearings for engagement with the rotatable shaft of a yaw axis position sensing potentiometer 306. The plate 302 is shown to be cutaway at 304 in order that the bearing assembly 308 and the potentiometer 306 be visible in FIG. 3.

Attached to the shaft of the yaw axis bearing assembly is a radially relieved yoke member 310 which is used to support the outer race 320 of the roll axis bearing assembly 114 which was shown in FIG. 1. The inner race of the roll axis bearing assembly 114 is indicated at 322 in FIG. 3, and the plurality of ball bearing members which are held captive between the races 320 and 322 are indicated typically at 324 in FIG. 3.

The yoke member 310 is shown to be one of a series of such yoke members, the other members of this series being indicated at 314, 316, and 318 in FIG. 3 with these latter three yoke members being attached to the inner race 322 of the bearing assembly. Each of these yoke members is actually fabricated as two mating pieces which are held together by means of fastening elements such as the machine screws indicated at 312 for the yoke member 310. Preferably, the machine screws 312 also provide a clamping action between the two halves of the yoke members 310, 314, 316, and 318 in order that they be capable of gripping or clamping to the bearing race members. The bearing assembly 114 may be one of many commercially available annularly thin ball bearing assemblies having an internal race diameter that is capable of accepting the largest human hand expected by a test subject. A KAYDON type KD090CPO ball bearing assembly available from McMaster-Carr Supply Company has been found suitable for this purpose.

The two yoke members 314 and 316 are preferably received along diametrically aligned radii of the inner diameter of the race 322, however, higher or lower positioning of these yokes on a chord that is parallel to a diameter of the race 322 may be accomplished if desired. The yokes 314 and 316 comprise portions of the pitch axis bearing assembly 116 which was identified in FIG. 1, with the yoke 314 being located at the opposite end of the pitch axis bearing suspended support member 118 which was also identified in FIG. 1. The shaft of a pitch axis sensing potentiometer 333 is connected through a support member bearing assembly 326 to the yoke 314 in order to provide position indicative electrical signals for the support member 118. These signals travel via the multiconductor tether cable 350 that communicates with a data processing apparatus or other circuitry used to process and/or display the information provided by the test subject 100. The potentiometer 333 may be of the linear tapered, single-turn variety such as the Clarostat Type J which is widely distributed in the electronic components market. The potentiometer 306 used in the base of the three-axis system 110 may also be of this same type. A mechanical coupling member 328 may be used between the shaft of the potentiometer 333 and the shaft of the bearing assembly 326 as required.

The pitch axis bearing suspended support member 118 is shown to be cutaway at 330 and also at 332, the latter cutaway being actually existent in the illustrated embodiment apparatus in order to accommodate the potentiometer 333. The cutaway 330 is accomplished for illustration purposes in the FIG. 3 drawing. A similar cutaway region also accomplished for illustration purposes is shown at 334 for the hand engagement assembly plate member 335.

The arm of the test subject 110 is represented at 338 in FIG. 3 and the hand at 339. Engagement of the test subject's hand with the plate member 335 of the hand engagement assembly 120 is preferably accomplished by way of a glove or similar arrangement which is represented at 336 in FIG. 3. The glove 336 may be attached to the lower side of the plate member 335 by way of adhesive or glue materials which are supplemented by mechanical fastening elements such as screws and washers, and are also aided by a series of strap or webbing members disposed around the finger portions of the glove 336 as is indicated at 340 in the FIG. 3 drawing. The plate member 335 may be fabricated from any material such as plastic, wood, metal, or composite materials such as fiberglass, in order to accommodate the attachments described here, and in order that it be easily and removably attached to the support member 118.

In order to communicate the relative positioning of the inner and outer races 322 and 320 of the roll axis bearing assembly 114 to the remote data collecting apparatus, there is provided in the FIG. 3 apparatus a third potentiometer element 128 which is mounted on the yoke half 342 and engages with the outer periphery of the outer race 320 by way of a friction roller 344. The potentiometer 128 is preferably of the multiple-turn variety, a 10-turn potentiometer such as the type 73JA manufactured by Clarostat being found suitable. The relative diameters of the friction roller 344 and the periphery of the outer race 320 determines the number of turns characteristic needed in the potentiometer 128, however, for most data gathering purposes, a 10-turn potentiometer and a diameter of 1 inch for the friction roller is suitable for use with the 10 inch diameter of the above-indicated bearing for the assembly 114. A bracket 343 is used to hold the potentiometer 128 in position with respect to the yoke 318 and the outer periphery of the outer race 320. A multiple conductored cable 348 which is secured by way of the clamps 346 and 352 may be used to communicate signals from the potentiometer 128 to the external data apparatus.

As was approached in the discussion above, a significant aspect of the FIG. 3 tactile communications apparatus 110 is associated with the location of the test subject's hand 339 in a position below the support member 118 in an effort to remove data biasing clue information from the touch senses of the test subject's fingers. By disposing the glove 336 below the plate member 335 it is found that the forces exerted on the test subject's finger surfaces are so distributed as to make sensing of a net gravity vector direction unlikely. The use of a glove member for these purposes is also beneficial in that military pilots are often provided with glove protection which would similarly deny a sense of gravity direction from the controls of an aircraft. The glove 336 may be of the type used for aircraft pilot protection or any conveniently available glove or any similar article.

Another aspect of the FIG. 3 illustrated tactile communications apparatus concerns its relative symmetry and dynamic balance and thereby its immunity to g-field generated forces which would also provide clue information to the test subject if present. As a supplement to this aspect of the FIG. 3 apparatus, the hand engagement assembly plate member 335 is provided in a plurality of differing sizes and shapes in order to accommodate the differing sized hands of differing test subjects while maintaining each hand in a desired neutral position with respect to the bearing assembly 114. Neutral here refers to the supported forearm resting in a horizontal position when relaxed.

As also indicated above, an additional part of the test subject size accommodation and the g-force immunity provided by the FIG. 3 apparatus is vested in the armrest assembly 126 and its location with respect to the tactile communications apparatus 110. Preferably, for minimal sensing of the g-forces and minimal provision of clues to the test subject, the armrest assembly 126 includes a variable position elbow support located at the ulnar base of the test subject 100.

As a convenience in initializing the tactile communications apparatus 110 at the beginning of a test run, it has been found desirable to place calibration marks on each of the bearing assemblies 308, 114, and 116, a plate 354 providing a location for such calibration marks for the bearing assembly 116. By way of these calibration marks, the test subject or a technician preparing the tactile communications apparatus for use can place the apparatus in the neutral position of each bearing assembly and assure that the remote indications of this neutral position are correct. Similarly, calibration marks at known angular displacements of the three coordinate axis bearings of the FIG. 3 apparatus may also be employed to verify the desired operation of the display and data recording apparatus at the remote location served by the multiple conductor cables 348 and 350.

Variations of the FIG. 3 described apparatus are possible within the scope of the invention. One such variation, for example involves replacing the position sensing potentiometer with digital position encoders.

The present apparatus therefore provides a viable and convenient answer for the need to provide a g-force stressed and otherwise occupied test subject with a reliable and repeatable means of tactile communications. A primary use of this communication relates to test subject perception of where the net gravity vector or some other force vector, is oriented at a time of interest. In the presently described apparatus a flexible test subject environment is provided in combination with communication that can be accomplished upon request merely by having the tested subject communicate in the normally used and well understood fashion of talking with his/her hands. Communication achieved in this manner is believed to be significantly improved in freedom from data biasing clues as well as in repeatability and reliability in comparison with previous attempts to achieve such communication.

While the apparatus and method herein described constitute a preferred embodiment of the invention, it is to be understood that the invention is not limited to this precise form of apparatus or method and that changes may be made therein without departing from the scope of the invention which is defined in the appended claims.

I claim:

1. The method for communicating perceived physical attitude describing information from a g-force stressed human test subject to a data processor comprising the steps of:

disposing said human test subject in a body conforming and torso supporting capture frame located within a g-force generating apparatus;

supporting an arm and hand peripheral extremity of said human test subject in a body displaced position wherein engagement with a hand position responsive multiple axis of freedom electrical signal generating transducer apparatus is achievable;

assigning palm positioning as a converse with the hand communication protocol for communication from said human test subject to said data processor;

engaging predetermined hand portions of said human test subject in captive relationship with said hand position responsive multiple axis of freedom electrical signal generating transducer apparatus;

exposing said test subject and transducer apparatus to g-force field of predetermined selective orientation;

selecting with predetermined regimen a plurality of hand positionings by said human test subject as communicated perceptions by said test subject of experienced physical attitude; and conveying said electrical signals from said transducer apparatus to said data processor via electrically conductive communicating paths.

2. The method of claim 1 wherein said engaging step includes disposing a back of the hand region of said human test subject adjacent a force responsive portion of said transducer apparatus; the palm and finger grip portions of said test subject's hand being minimally engaged with said transducer apparatus with minimal information forces being communicated from said transducer apparatus to said test subject's hand.

3. The method of claim 2 further including the step of exposing said human test subject to selected additional of the stresses of:
   altered predetermined torso positioning with respect to said g-force field;
   altered predetermined head positioning with respect to said g-force field;
   predetermined visual image information; and
   attention distracting work assignments, during said exposure to g-force field step.

4. The method of claim 3 wherein said visual image information includes selected of the images of:
   total darkness;
   terrain representations;
   celestial body representations; and
   changing random pattern representations.

5. The method of claim 1 wherein said supporting step includes holding an elbow adjacent forearm portion of said test subject immobile with respect to said capture frame and said transducer apparatus and further including the step of selecting physical dimensions attending said transducer apparatus and said holding step with respect to physical size of selected human test subjects.

6. The method for communicating perceived attitude information from the test subject of a g-force field inclusive spatial disorientation study comprising the steps of:
   selecting one hand as a peripheral limb communicating appendage of said test subject;
   defining an open hand palm of said selected hand as a surface region of reference for said test subject communicating;
   minimizing spatial orientation suggestive clue delivering information received by said test subject from said hand communicating appendage during communicating events and from hand support against said g forces, said minimizing including,
   suspending said hand in said opened hand position and in test subject perceived free space,
   said suspending being from an overlaying back of the hand disposed support member, and
   spreading suspension and communicating forces incurred by said hand over substantial area palm, finger grip, and fingertip surface regions of said hand;
   discouraging the seeking of communications delivered orientation clues by said test subject with attention occupying events selected from the group which includes superficial work assignments, visual stimulus information input, and audio stimulus information input.

7. Quantitative perceived attitude communication apparatus comprising the combination of:

a stationary support member fixedly mounted adjacent a vertebrate test subject reception space and within a predetermined peripheral limb excursion distance of said test subject reception space;

a first movable support member mounted on said stationary support member in rotational freedom about a first axis of a three-axis coordinate set;

a second movable support member received on said first movable support member and having rotational freedom about a second axis of said three-axis coordinate set;

said first and second movable support members in combination having rotational freedom about two axes of said coordinate axis set;

position sensing means for generating communication signals responsive to instantaneous second axis angular positions of said second movable support member with respect to said first movable support member;

a third movable support member received on said second movable support member and having rotational freedom about a third axis of said three-axis coordinate set;

said first, second and third movable support members in combination having rotational freedom about all three axes of said three-axis coordinate set;

additional position sensing means for generating additional communication signals responsive to instantaneous third axis angular positions of said third movable support member with respect to said second movable support member; and means received on said third movable support member, and thereby in rotational freedom about all three axes of said three-axis coordinate set for engaging, in capturing relationship, said predetermined peripheral limb of a test subject disposed in said test subject reception space and for receiving peripheral limb conveyed attitude communications from said test subject.

8. The communication apparatus of claim 7 wherein said position sensing means is a second position sensing means, said communications signals are second communication signals, said additional position sensing means is a third position sensing means, and said additional communication signals are third communications signals, and further including first position sensing means for generating first communications signals responsive to first axis instantaneous angular positions of said first movable support member with respect to said stationary support member.

9. The communication apparatus of claim 7 wherein said vertebrate test subject is a human and said predetermined peripheral limb comprises a hand and arm portion of said human.

10. The communication apparatus of claim 9 wherein said means received on said third movable support member includes finger engaging means disposed over a lower surface portion of a planar member suspended on said third movable support member.

11. The communication apparatus of claim 10 further including arm rest means disposed in said test subject reception space intermediate said human and said stationary support member for supporting an elbow adjacent portion of said human test subject's arm in a g-force influence minimizing fixed position.

12. The communication apparatus of claim 11 further including means subject size difference accommodation means comprising a plurality of differently sized of said planar members and a plurality of selectable different location positions for said arm rest means.

13. The communication apparatus of claim 10 wherein said finger engaging means comprises a glove.

14. The communication apparatus of claim 7 wherein said first movable support member rotational freedom comprises rotation about a vertically disposed first axis, said second movable support member rotational freedom comprises rotation about a horizontal axis extending perpendicular to said first axis and parallel to said peripheral limb, and said third movable support member rotational freedom comprises rotation about a horizontal axis extending perpendicular to both said first axis and said peripheral limb.

15. The communication apparatus of claim 14 wherein said predetermined peripheral limb comprises a hand and arm portion of a human test subject and wherein said second movable support member includes a ball bearing assembly having an internal race member portion disposed surrounding said hand and rotatable around said second axis.

16. The communication apparatus of claim 7 wherein said position sensing means include plural electrical potentiometer means responsive to rotational movement about said axes for generating electrical signals representative of said instantaneous angular positions.

17. The communication apparatus of claim 16 wherein said stationary support member and said test subject reception space are received within a dynamic effect simulator centrifuge apparatus.

18. The communication apparatus of claim 16 further including electrically conductive means for conveying electrical signals from said electrical potentiometer means to said stationary support member.

19. The communication apparatus of claim 7 wherein said first, second, and third movable support members are dynamically balanced and inherently unresponsive to g-force fields incurred by said apparatus.

20. The communication apparatus of claim 7 wherein said apparatus is received in the gondola of a dynamic effects simulator.

* * * * *